(12) United States Patent
Wang et al.

(10) Patent No.: US 8,547,788 B2
(45) Date of Patent: Oct. 1, 2013

(54) METHODS FOR MAKING ACOUSTIC ANISOTROPY LOGGING WHILE DRILLING MEASUREMENTS

(75) Inventors: Tsili Wang, Katy, TX (US); Paul Boonen, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 485 days.

(21) Appl. No.: 12/781,266

(22) Filed: May 17, 2010

(65) Prior Publication Data

US 2011/0280102 A1 Nov. 17, 2011

(51) Int. Cl.
*G01V 1/00* (2006.01)

(52) U.S. Cl.
USPC ...................... 367/25; 367/38; 367/73; 703/2

(58) Field of Classification Search
USPC ................... 367/25, 38, 73; 703/2
See application file for complete search history.

(56) References Cited

U.S. PATENT DOCUMENTS

| | | | |
|---|---|---|---|
| 4,594,691 A | 6/1986 | Kimball et al. | |
| 4,698,792 A | 10/1987 | Kurkjian et al. | |
| 4,774,693 A | 9/1988 | Winbow et al. | |
| 4,779,236 A | 10/1988 | Sondergeld | |
| 5,278,805 A | 1/1994 | Kimball | |
| 5,639,997 A | 6/1997 | Mallett | |
| 5,780,784 A | 7/1998 | Robbins | |
| 5,852,262 A | 12/1998 | Gill et al. | |
| 5,886,303 A | 3/1999 | Rodney | |
| 5,936,913 A | 8/1999 | Gill et al. | |
| 6,470,275 B1 | 10/2002 | Dubinsky | |
| 6,614,360 B1 | 9/2003 | Leggett, III et al. | |
| 6,631,327 B2 | 10/2003 | Hsu et al. | |
| 6,661,737 B2 | 12/2003 | Wisniewski et al. | |
| 6,671,224 B1 | 12/2003 | Pabon | |
| 6,678,616 B1 | 1/2004 | Winkler et al. | |
| 6,714,480 B2 | 3/2004 | Sinha et al. | |
| 6,766,252 B2 | 7/2004 | Blanch et al. | |
| 6,791,899 B2 | 9/2004 | Blanch et al. | |
| 7,035,924 B2 | 4/2006 | DeLuca et al. | |
| 7,039,524 B2 | 5/2006 | Haugland | |
| 7,260,477 B2 | 8/2007 | Haugland | |
| 8,184,502 B2 * | 5/2012 | Xu et al. | 367/38 |
| 2011/0019501 A1 * | 1/2011 | Market | 367/34 |
| 2011/0280101 A1 | 11/2011 | Wang | |

OTHER PUBLICATIONS

X. M. Tang, et al., "Shear-Velocity Measurements in the Logging-While Drilling Environment: Modeling and Field Evaluations," Petrophysics, vol. 44, No. 2 (Mar.-Apr. 2003), pp. 79-90.
X. M. Tang, et al., "A dispersive-wave processing technique for estimating formation shear velocity from dipole and Stoneley waveforms," Petrophysics, vol. 60, No. 1 (Jan.-Feb. 1995), pp. 19-28, 9 Figs.

(Continued)

*Primary Examiner* — Mark Hellner (74) *Attorney, Agent, or Firm* — Kenneth Liu; Jeremy Berman (57) ABSTRACT

A method for determining an acoustic anisotropy of a subterranean formation includes measuring acoustic wave slownesses at three or more toolface angles while rotating a logging while drilling tool in a borehole. Compressional, shear, and/or guided wave slownesses may be measured. The measured slownesses are fit to a mathematical model to obtain maximum and minimum slownesses. The maximum and minimum slownesses are processed to determine the acoustic anisotropy of the formation.

20 Claims, 4 Drawing Sheets

(56) References Cited

OTHER PUBLICATIONS

G. L. Varsamis, et al, "LWD Shear Velocity Logging in Slow Formations Design Decisions and Case Histories," SPWLA 41st Annual Logging Symposium, Jun. 4-7, 2000, Paper O.

C. H. Cheng and M. N. Toksoz, "Elastic Wave Propagation in a Fluid-Filled Borehole and Synthetic Acoustic Logs," Geophysics, vol. 46, No. 7, Jul. 1981, pp. 1042-1053.

D. P. Schmitt, "Shear Wave Logging in Elastic Formations," J. Acoust. Soc. A., 84(6), Dec. 1988, pp. 2215-2229.

M. T. Taner, F. Koehler, and R. E. Sheriff, "Complex seismic trace analysis," Geophysics, vol. 44, No. 6 (Jun. 1979); pp. 1041-1063.

C. H. Cheng and M. Nfi Toksoz, "Determination of Shear Wave Velocities in "Slow" Formations," SPWLA 24th Annual Logging Symposium, Jun. 37-30, 1983, Paper V.

Georgios L. Varsamis, et al., "A New MWD Full Wave Dual Mode Sonic Tool Design and Case Histories," SPWLA 40th Annual Logging Symposium, May 30-Jun. 3, 1999, Paper P.

F. El-Wazeer, et al., "Applications for a Full Wave Sonic LWD Tool in the Middle East," Society of Petroleum Engineers 13th Middle East Oil Show & Conference, Apr. 5-8, 2003, SPE 81474.

Jennifer Market, et al., "Processing and Quality Control of LWD Dipole Sonic Measurements," SPWLA 43rd Annual Logging Symposium, Jun. 2-5, 2002, Paper PP.

Chaur-Jian Hsu and Kikash K. Sinha, "Mandrel effects on the dipole flexural mode in a borehole," J. Acoust. Soc. Am. 104(4), Oct. 1998, pp. 2025-2039.

Boonen, P., Yogeswaren, E., "A dual-frequency LWD sonic tool expands existing unipolar transmitter technology to supply shear wave data in soft formations" SPWLA 45th Annual Logging Symposium, Jun. 6-9, 2004.

Market, J. and Deady, R., "Azimuthal Sonic Measurements: New methods in theory and practice" SPWLA 49th Annual Logging Symposium, May 25-28, 2008.

Market, J., "New Broad Frequency LWD Multipole Tool Provides High Quality Compressional and Shear Data in a Wide Variety of Formations" SPWLA 48th Annual Logging Symposium, Jun. 3-6, 2007.

Kozak, M., "Phase Velocity Processing for Acoustic Logging-While-Drilling Full Waveform Data" SPWLA 42nd Annual Logging Symposium, Jun. 17-20, 2001.

* cited by examiner

METHODS FOR MAKING ACOUSTIC ANISOTROPY LOGGING WHILE DRILLING MEASUREMENTS

RELATED APPLICATIONS

None.

FIELD OF THE INVENTION

The present invention relates generally to acoustic logging of subterranean formations. More particularly, this invention relates to a method for determining acoustic velocity anisotropy using a logging while drilling tool.

BACKGROUND OF THE INVENTION

The use of acoustic (e.g., audible and/or ultrasonic) measurement systems in prior art downhole applications, such as logging while drilling (LWD), measurement while drilling (MWD), and wireline logging applications, is well known. Such acoustic measurement systems are utilized in a variety of downhole applications including, for example, borehole caliper measurements, measurement of drilling fluid properties, and the determination of various physical properties of a formation. In one application, acoustic waveforms may be generated at one or more transmitters deployed in the borehole. The acoustic responses may then be received at an array of longitudinally spaced apart receivers deployed in the borehole. Acoustic logging in this manner provides an important set of borehole data and is commonly used in both LWD and wireline applications to determine compressional and shear wave velocities (also referred to as slowness) of a formation.

It will be appreciated that the terms slowness and velocity are often used interchangeably in the art. They will likewise be used interchangeably herein with the understanding that they are inversely related to one another and that the measurement of either may be converted to the other by simple and known mathematical calculations. Additionally, as used in the art, there is not always a clear distinction between the terms LWD and MWD. Generally speaking MWD typically refers to measurements taken for the purpose of drilling the well (e.g., navigation) whereas LWD typically refers to measurements taken for the purpose of analysis of the formation and surrounding borehole conditions. Nevertheless, these terms are herein used synonymously and interchangeably.

In the analysis of acoustic logging measurements, the received acoustic waveforms are typically coherence processed to obtain a time-slowness plot. In a time-slowness plot, also referred to as a slowness-time-coherence (STC) plot or a semblance plot, a set of several signals from the array of acoustic receivers is processed with the incorporation of separate time shifts for each received signal. The separate time shifts are based on a slowness value assumed for the purpose of processing the waveforms. The processing provides a result, known as coherence, which can signify the presence of a discernable signal received by the separate receivers. In this manner compressional and shear wave arrivals can be discerned in the received waveforms, leading to determinations of their velocities. The determined compressional and shear wave velocities are related to compressive and shear strengths of the surrounding formation, and thus provide useful information about the formation.

Subterranean earth formations are rarely homogeneous, but instead include geologic features such as fractures, thin beddings, microlayering in shales, and strata of differing compositions, as well as oil and gas deposits. Geologic features in formations generally lead to stresses and formation density variations, which change the way acoustic waves propagate in the formation. The distribution of fractures and other geologic features in the vicinity of a borehole can cause acoustic velocity anisotropy. The measured compressional and shear velocities may then depend on the toolface angle, an azimuthal direction about the borehole defined with respect to a reference direction.

In acoustically slow formations, in which the velocity of formation shear waves is less than the speed of sound in the drilling fluid (mud), shear wave slowness determination is known to be complicated by poor transmission of shear wave energy across the boundary between the formation and the borehole. Techniques to address this difficulty by estimating shear wave slowness from the guided wave slowness of, for example, excited pure modes also present problems. These problems include dispersive effects in borehole guided wave propagation, difficulty in exciting pure modes, and the expense and complexity of transducer arrangements and timing in LWD tools tailored to produce a pure mode and to suppress other modes.

The difficulty in generating such borehole guided waves is also known to be further exacerbated by tool eccentricity in the borehole (e.g., in highly deviated wells in which the tool typically lies on the low side of the borehole). Effective generation and detection of borehole guided waves can depend on transducer standoff. It can be difficult to obtain shear wave slowness measurements for particular toolface angles when the LWD tool is eccentered, particularly in a large diameter borehole or in a portion of a borehole having a larger diameter. Such sensitivity to tool eccentricity can hinder shear anisotropy determination.

Therefore, there exists a need for an improved method for acoustic anisotropy determination during logging while drilling. In particular, there is a need for an improved method for acoustic anisotropy determination (including shear wave anisotropy) that is less sensitive to tool eccentricity and is also effective in acoustically slow formations during logging while drilling operations.

SUMMARY OF THE INVENTION

The present invention addresses one or more of the above-described drawbacks in currently available and practiced methods for determining acoustic velocity anisotropy of a subterranean formation during logging while drilling. In one exemplary embodiment, the invention includes rotating a unipole logging while drilling (LWD) tool in a borehole and measuring acoustic wave slownesses for at least three toolface angles. In a preferred embodiment, the unipole LWD tool is a cross-unipole LWD tool, in which a unipole transmitter is azimuthally spaced apart by 180 degrees from a linear array of longitudinally spaced unipole receivers. The measured slownesses are fit to a mathematical model of the dependence of acoustic slownesses on toolface angle (azimuthal position) to generate a maximum and a minimum slowness. The maximum and minimum slownesses are then processed to obtain a measure of the acoustic anisotropy in the formation. In one preferred embodiment, the measure of acoustic anisotropy is obtained by forming the ratio of the difference between the maximum and minimum slownesses to their average. An azimuthal position for the maximum slowness can be determined based on the fit to the mathematical model.

In certain embodiments, a measure of shear wave anisotropy is obtained via measurements of borehole guided wave slownesses. The measure of shear wave anisotropy is approximated by a measure of guided wave anisotropy. In various other embodiments, the measure of shear wave anisotropy is obtained after applying dispersion corrections to maximum and minimum guided wave slownesses to derive maximum and minimum shear wave slownesses. For example, in one exemplary embodiment, an empirical equation is used to apply dispersion corrections.

Exemplary embodiments of the present invention provide several technical advantages. For example, a unipole tool can create multiple borehole guided wave modes without increased costs of complicated arrangements of transducers and complicated timing in conventional tools that use guided waves for shear wave slowness measurements. Moreover, azimuthal spacing of the linear array of unipole receivers from the unipole transmitter tends to advantageously reduce dispersion correction when the received waveforms are processed to obtain shear wave slowness. Embodiments in which the unipole transmitter and the linear array are azimuthally spaced apart by about 180 degrees may further be suitable for making acoustic anisotropy measurements in that these embodiments tend to reduce the undesired azimuthal sensitivity to tool eccentricity. In this manner, shear wave anisotropy information can be extracted with a high degree of confidence from acoustic velocity measurements during logging while drilling.

In one aspect the present invention includes a method for determining an acoustic anisotropy of a subterranean formation. The method includes rotating an acoustic logging while drilling tool in a borehole, the tool including at least one acoustic transmitter and a linear array of longitudinally spaced acoustic receivers longitudinally spaced apart from the transmitter. An acoustic wave slowness of the formation is measured at three or more toolface angles while rotating the tool. The measured acoustic wave slownesses are fit to a mathematical model to obtain a maximum slowness and a minimum slowness. The maximum and minimum slownesses are processed to determine the acoustic anisotropy of the subterranean formation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures or methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
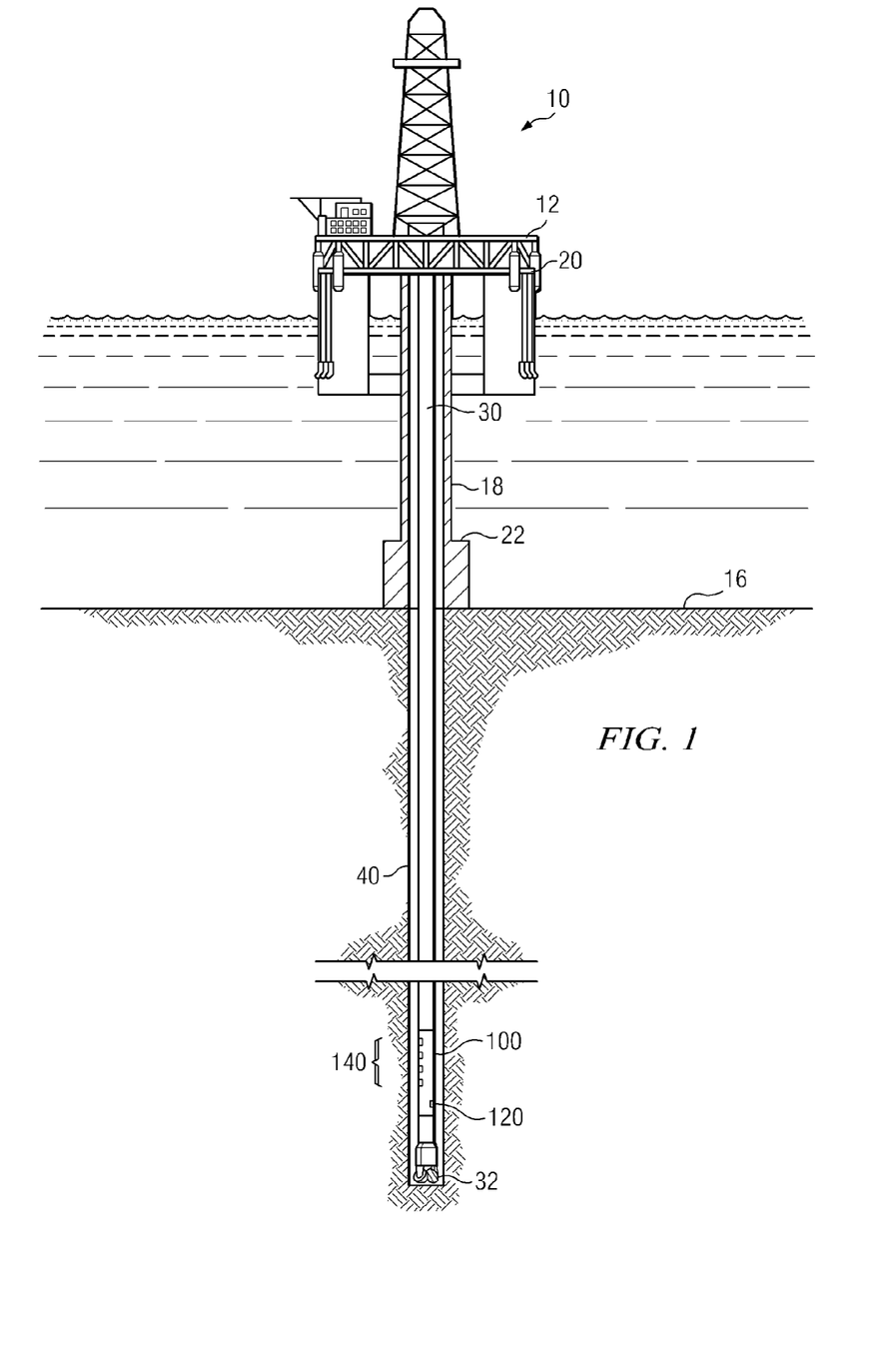
FIG. 1 depicts an acoustic logging tool deployed according to the present invention in an offshore oil or gas drilling assembly.

FIG. 1 depicts an acoustic logging while drilling (LWD) tool 100 deployed according to this invention in an offshore oil or gas drilling assembly, generally denoted 10. Acoustic LWD tool 100 is described in detail in co-pending U.S. patent application Ser. No. 12/781,222 to Wang, titled "Unipole And Bipole Acoustic Logging While Drilling Tools," filed May 17, 2010, and herein incorporated by reference in its entirety. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and an acoustic logging tool 100. As shown in FIG. 1, and described in more detail below with respect to FIG. 3, LWD tool 100 includes at least one unipole transmitter 120 and at least one linear array 140 of longitudinally spaced unipole receivers. In the exemplary embodiment depicted, the linear array of receivers 140 is both longitudinally and azimuthally spaced apart from the unipole transmitter 120. Drill string 30 on FIG. 1 may further include a downhole drill motor, a mud pulse telemetry system, and one or more other sensors, such as a nuclear logging instrument and/or an acoustic caliper tool, for sensing downhole characteristics of the borehole and the surrounding formation. The invention is not limited in these regards.

It will be understood by those of ordinary skill in the art that the method embodiments of the present invention are not limited to use with a semisubmersible platform as illustrated in FIG. 1. Method embodiments of the present invention are equally well suited for use in any kind of subterranean drilling operation, either offshore or onshore.

Prior to discussing embodiments of the present invention in connection with FIGS. 4 to 6 below, similarities and differences between a conventional unipole acoustic logging tool and unipole acoustic logging tool 100 are first presented. Features of the conventional unipole tool are discussed in connection with FIG. 2, before unipole acoustic logging tool 100 is discussed in more detail in connection with FIG. 3. Although particular advantages may accrue with use of unipole acoustic logging tool 100 in embodiments of the present invention, it will be appreciated that certain advantages can also be realized with the use of a conventional unipole acoustic tool. Advantages of the present invention may also be realized with the use of conventional non-unipole tools.

Figure 2:
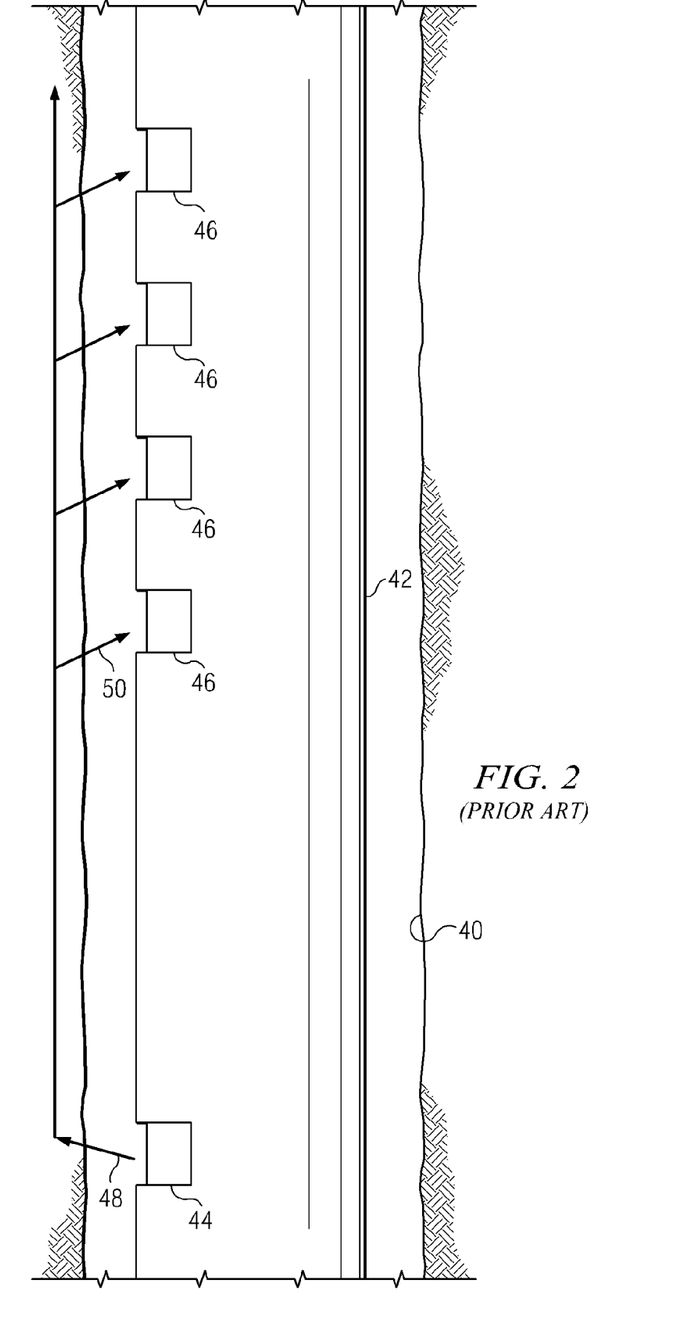
FIG. 2 depicts a cross sectional view of a portion of a conventional acoustic logging while drilling tool deployed in a borehole.

FIG. 2 depicts a cross sectional view of a portion of a conventional unipole acoustic LWD tool 42 deployed in a borehole 40. Logging tool 42 is similar to that disclosed in commonly assigned U.S. Pat. No. 7,039,524 to Haugland (the Haugland patent) and includes a unipole transmitter 44 longitudinally offset from a linear array of longitudinally spaced apart unipole acoustic receivers 46. The transmitter 44 and receivers 46 are circumferentially aligned, i.e., they are deployed at the same azimuthal position on the tool body. As also shown, the receivers 46 are equally (or uniformly) spaced, e.g., at a spacing between about 6 and 12 inches.

It will be understood that as used herein the term "unipole transmitter" refers to a transmitter (a source) including exactly one transducer located at a single azimuthal position on the tool body. The unipole transmitter therefore tends to propagate a directional pressure pulse. Similarly, the term "unipole receiver" will be understood to refer to a receiver including exactly one transducer located at a single azimuthal position on the tool body. The unipole receiver tends to have a directional sensitivity to an incoming acoustic wave, complementary to the directionality of the single transducer used in a unipole transmitter. It should be noted that unipole transmitters and receivers (as the terms are used herein) are distinct from monopole transmitters and receivers. A conventional monopole transmitter, for example, includes multiple circumferentially spaced transducers (e.g., 4, 8, or even more) deployed about the tool body. These multiple transducers are configured to fire simultaneously so as to produce a pressure pulse that radiates omni-directionally away from the monopole transmitter. Unipole transmitters and receivers are also distinct from dipole and quadrupole transmitters and receivers, which also typically utilize multiple circumferentially spaced transducers deployed about the tool body. These pure (or pseudo pure) mode transmitters and receivers typically further include complex circuitry configured, for example, to ordain the relative timing of the various transducers (e.g., the timing of firing in a transmitter). No such circuitry is required in a unipole transmitter.

Moreover, it will be further understood that a logging tool having a "single unipole transmitter" refers to a tool including exactly one unipole transmitter configured to transmit acoustic waves at any one particular frequency. It will be understood, for example, that a logging tool having a "single unipole transmitter" may include a second transmitter configured to transmit acoustic waves at a distinct (different) second frequency. A logging tool having a "single linear array of unipole receivers" refers to a tool including exactly one linear array of unipole receivers. A "linear array of unipole receivers" refers to a plurality of longitudinally spaced unipole receivers deployed at a single azimuthal (circumferential) position on the tool body.

With reference again to FIG. 2, those of ordinary skill in the art will appreciate that unipole transmitter 44 transmits acoustic energy into the borehole as depicted at 48 during acoustic logging operations. A portion of the transmitted energy may enter the formation and induce compressional and/or shear waves therein. These waves propagate through the formation and may be received at the unipole receivers 46 as depicted at 50. As is known in the art, the received compressional and shear waves may be utilized to compute compressional and shear wave velocities of the formation (e.g., via conventional time-of-flight calculations). The compressional and shear wave velocities are known to be related to compressive and shear strengths of the surrounding formation, and thus provide useful information about the formation.

As described above in the Background Section, determination of shear slowness in acoustically slow formations can be difficult owing to the lack of shear waves refracted back into the borehole fluid. Shear waves propagating in the formation leak energy into the borehole fluid as evanescent waves (also referred to as leaky shear waves) which decay exponentially with distance from the borehole wall. These evanescent waves are usually not detectable by a logging tool. Certain prior art methods intended to overcome this problem commonly involve measuring the slowness of a relatively pure mode borehole guided wave, such as Stoneley waves (excited by monopole sources), flexural waves (excited by dipole sources), and screw waves (excited by quadrupole sources). In LWD applications, the trend in the art is clearly towards the use of broadband quadrupole waveforms (see, for example, Tang, et al., in *Petrophysics*, vol. 44, pgs. 79-90, 2003). As described above, generating and receiving pure mode guided waves (e.g., screw waves) requires complex transmitter and receiver assemblies, which in turn increases tool expense and tends to reduce reliability.

A unipole tool (e.g., tool 42 in FIG. 2) makes use of a mixture of Stoneley, flexural, and screw waves (which are also referred to in the art as monopole, dipole, and quadrupole waves). The Haugland patent teaches a method in which mixed mode signals (referred to in the Haugland patent as multi-pole) may be utilized to determine a shear slowness without isolating, suppressing, or enhancing any particular waveform modes in either transmission or reception of the acoustic energy. The waveforms may be taken as they are received. For example, activities such as filtering, interference, or adding or subtracting of various waveforms from one transducer with that of another, are not required. Likewise, it is not necessary to deploy transmitters or receivers having a particular geometry, or to ordain the timing of various components to transmit or receive substantially pure or pseudo pure monopole, dipole, or quadrupole waveforms. As such, the Haugland patent purports to obviate the need for the complex transmitters and receivers of the prior art.

Figure 3:
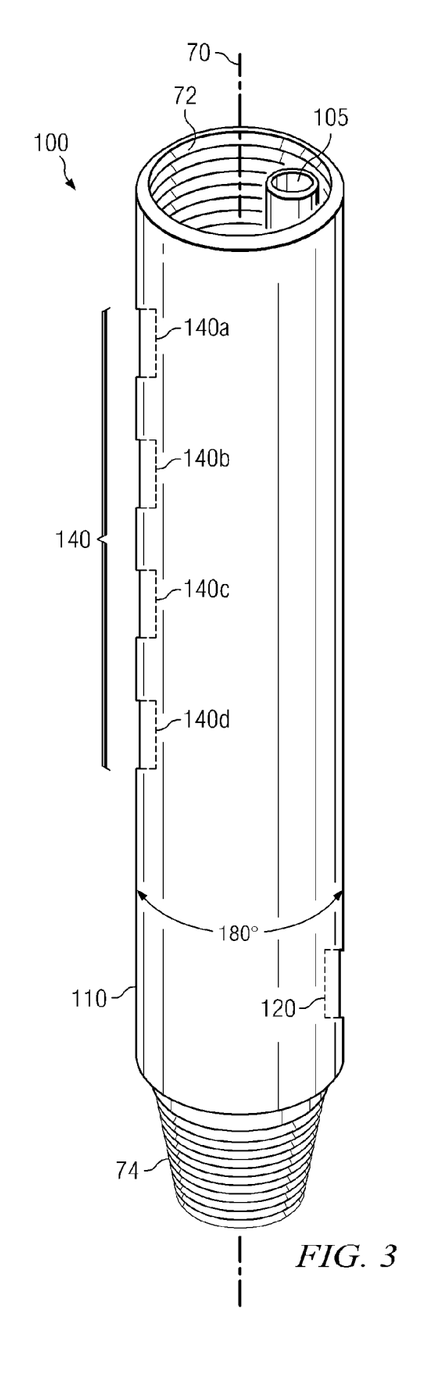
FIG. 3 depicts an acoustic logging tool suitable for use with exemplary method embodiments in accordance with the present invention.

Turning now to FIG. 3 a type of unipole acoustic LWD tool 100, referred to herein as a "cross-unipole" acoustic LWD tool, is depicted in perspective view. Cross-unipole LWD tool 100 is disclosed and claimed in the co-pending Wang application, and may preferably be deployed in accordance with embodiments of the present invention. Cross-unipole LWD tool 100 is typically a substantially cylindrical tool, being largely symmetrical about cylindrical axis 70 (also referred to herein as a longitudinal axis). Cross-unipole LWD tool 100 includes a substantially cylindrical downhole tool body 110 configured for connecting to a drill string and therefore typically, but not necessarily, includes threaded end portions 72 and 74. Through pipe 105 provides a conduit for the flow of drilling fluid downhole, for example, to a drill bit assembly. Cross-unipole LWD tool 100 includes a single unipole transmitter 120 deployed on the tool body 110 and configured to transmit an acoustic waveform into a subterranean borehole. Cross-unipole LWD tool 100 also includes a single linear array 140 of unipole receivers 140a, 140b, 140c, and 140d (140a-140d) deployed on the tool body 110.

In the cross-unipole LWD tool depicted on FIG. 3, the unipole transmitter 120 is both longitudinally and circumferentially spaced apart from the linear array 140. Generally, in a cross-unipole acoustic tool, the linear array 140 is azimuthally spaced apart from the unipole transmitter 120 by an azimuthal angle of about 180 degrees (i.e., the transmitter and the receiver array are deployed on opposite sides of the tool). The unipole receivers 140a-140d are configured to receive a transmitted acoustic waveform to produce a set of received waveforms. It is understood, of course, that in various other embodiments in accordance with the invention, a unipole LWD tool may be used in which the unipole transmitter 120 and the linear array 140 are azimuthally spaced apart by substantially any non-zero angle. The invention is not limited to deployment and use of cross-unipole LWD tools in which the azimuthal spacing between transmitter and receiver array is 180 degrees.

It will be appreciated that while the cross-unipole LWD tool 100 shown in FIG. 3 includes a receiver array 140 having four receivers 140a-140d, the tool need not be limited to any particular number of receivers. Thus, in certain embodiments the linear array 140 may include, for example, six or more unipole receivers. Moreover, in certain embodiments, the acoustic LWD tool 100 may include a plurality of unipole transmitters. For example, LWD tool 100 may include first and second longitudinally spaced unipole transmitters configured to transmit acoustic energy at corresponding first and second distinct frequencies (e.g., the first transmitter at a low frequency, e.g., 2-8 kHz, and the second transmitter at a high frequency, e.g., 10-20 kHz). The invention is not limited in these regards.

Figure 4:
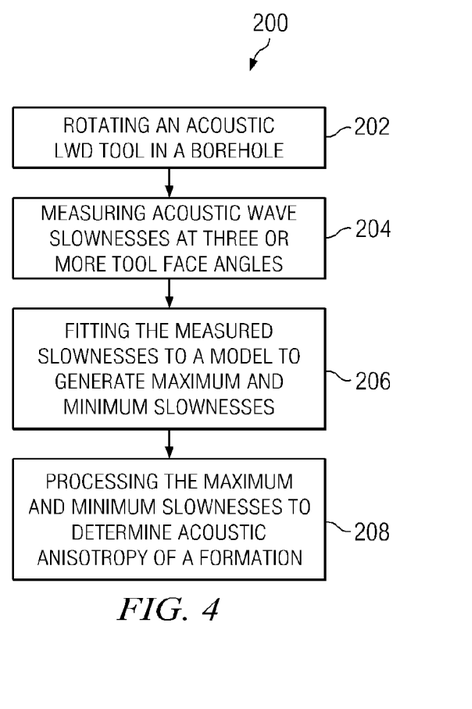
FIG. 4 depicts a flowchart of one exemplary method embodiment in accordance with the present invention.
Figure 5:
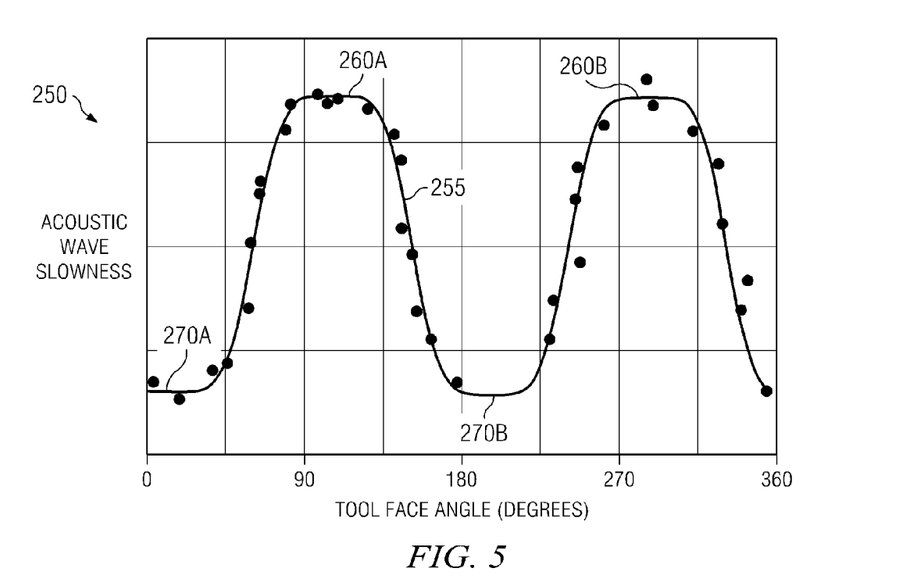
FIG. 5 depicts a plot showing a fit of acoustic slowness data vs. toolface angle to a mathematical model.

Turning now to discussion of the present invention, FIG. 4 depicts a flowchart of one exemplary method embodiment 200 in accordance with the present invention. At 202 an acoustic LWD tool is rotated in a subterranean borehole (e.g., with a drill string while drilling). At 204 the LWD tool is utilized to measure an acoustic wave slowness (such as a compressional or shear wave slowness) at three or more toolface angles while rotating in the borehole. The measured slownesses are fit to a mathematical model in 206 to determined maximum and minimum slowness values as a function of toolface angle. The maximum and minimum slowness values may then be further processed in 208 to determine the acoustic anisotropy of the subterranean formation.

Method 200 may make use of substantially any suitable acoustic logging tool having at least one acoustic transmitter and a linear array of longitudinally spaced acoustic receivers longitudinally spaced apart from the transmitter. Preferred embodiments of the invention make use of a unipole tool configuration, for example as depicted on FIGS. 2 and 3. Most preferred embodiments of the invention make use of a cross unipole tool, such as tool 100 depicted on FIG. 3. Suitable acoustic logging tools typically further include a toolface sensor (an azimuth sensor) or are in electronic communication with a toolface sensor located elsewhere in the bottom hole assembly. Conventional toolface sensors typically include one or more accelerometers and/or magnetometers. The invention is not limited to any particular toolface sensor embodiment.

With continued reference to FIG. 4, it will be understood by those of ordinary skill in the art that the terms "azimuth" and "toolface" are used interchangeably herein to refer to an angular measurement about the circumference of the tool (or borehole). In particular, the azimuth or toolface angle refers to the angular separation from a point of interest (e.g., the transmitter 120 or linear array 140) to a reference point. The angle is typically measured in the clockwise direction (although the invention is not limited in this regard), and the reference point is frequently the high side of the borehole or measurement tool, relative to the earth's gravitational field, or magnetic north.

Method 200 further includes measuring acoustic wave slownesses at three or more toolface angles at 204 as the tool rotates in the borehole. As known by those of ordinary skill in the art, measuring acoustic wave slowness with an LWD tool generally includes transmitting an acoustic waveform into the formation, receiving the transmitted waveforms at an array of receivers, and coherence processing the received waveforms, for example, by stacking time-shifted waveforms. It will be appreciated that carrying out acoustic wave slowness measurements at fewer than three toolface angles can preclude fitting a mathematical model to the measured acoustic wave slownesses with any validity or reliability in 206. In certain embodiments it may be advantageous to make acoustic slowness measurements at eight or more toolface angles, preferably covering at least half of the azimuthal range between 0 and 360 degrees.

In one exemplary serviceable embodiment of the invention, acoustic logging measurements may be made at some predetermined time interval (e.g., a 10 millisecond interval) while rotating. Meanwhile, a toolface sensor measures the toolface angle (e.g., of the linear array of receivers and/or the transmitter), as the tool rotates in the borehole. A toolface angle is then assigned to each acoustic logging measurement. The toolface angle is preferably measured at nearly the same instant in time as the acoustic energy is transmitted into the borehole (or often enough so that the toolface angle at the time of acoustic transmission may be adequately interpolated). It will be understood that in general, each acoustic logging measurement (slowness measurement) is assigned a corresponding toolface angle such that the acoustic slowness may be plotted with respect to the toolface angle.

Measurement of the acoustic wave slownesses at 204 typically entails repeatedly executing the following method steps: (i) firing the at least one acoustic transmitter to transmit an acoustic waveform into the formation, (ii) receiving transmitted acoustic waveforms at the receivers of the array; (iii) processing the received waveforms, e.g., via STC processing, to determine an acoustic slowness, and (iv) measuring a toolface angle. It should be understood that measuring the toolface angle preferably takes place at essentially the same time the transmitter is fired, but can also or instead take place at other times (e.g., at the approximate reception time at one of the receivers or at some time intermediate between the transmission and reception times). For an assumed tool rotation rate of 2 rotations per second (120 rpm), and a time interval of perhaps 0.5 milliseconds (ms) to 1.5 ms between firing the transmitter and reception of the acoustic wave at the selected receiver, the different times discussed above for measuring a toolface angle result in measured values that typically can differ by no more than about 0.4 to 1.1 degrees, that is, an azimuthal uncertainty of about 0.4 degree to about 1.1 degree.

With continued reference to method step 204 in FIG. 4, the acoustic wave slownesses may be measured for any suitable acoustic wave, for example, including compressional waves, shear waves (in fast formations), or guided waves (in slow formations). The invention is not limited in this regard. Moreover, it will be appreciated that the transmitter may operate at substantially any suitable frequency. For example, in embodiments in which shear wave or guided wave slownesses are determined, the transmitter is preferably configured to transmit a low frequency waveform (e.g., in the range from about 2 to about 8 kHz). In embodiments in which compressional wave slownesses are determined, the transmitter is preferably configured to transmit a higher frequency waveform (e.g., in the range from about 10 to about 20 kHz).

Method 200 may optionally further include measuring the borehole caliper and the lateral displacement of the tool in the borehole. In such embodiments, the tool typically includes three or more acoustic standoff sensors deployed about the circumference of the tool. The standoff sensors are preferably deployed in close proximity to the transmitter and/or the linear array of receivers. Methods for making borehole caliper and lateral displacement measurements are well known in the art. Commonly assigned U.S. Pat. No. 7,260,477 to Haugland discloses one such methodology.

Method 200 may still further include downhole measurement of drilling fluid velocity and/or density. Such embodiments often require the use of a suitable sensor, generically referred to as a mud property sensor deployed in close proximity to the transmitter and/or receivers. While borehole caliper, lateral displacement, and drilling fluid property measurements may be advantageous in certain embodiments of the invention, it will be understood that the invention does not require these measurements and is not so limited.

When available, borehole caliper and mud property measurements may be advantageously utilized in calculating a dispersion correction to be applied to a guided wave slowness. As discussed previously, in an acoustically slow formation, direct measurement of shear wave slowness tends to be inhibited by refractive effects at the borehole wall. Shear wave slownesses in slow formations are generally estimated via the measurement of guided wave slownesses, and subsequent application of dispersion corrections to the guided wave slownesses. The borehole guided wave slownesses are usually larger than the shear wave slownesses. For an acoustic LWD tool centered in a borehole, the guided wave slowness, DTG, may be related to the shear wave slowness DTS, for example, via the following mathematical relation $$DTG = DTS + \Delta DT(DTS, DT_{mud}, DTP, BHD) \quad \text{Equation 1}$$

where $\Delta DT$ represents the dispersion effect, $DT_{mud}$ represents the slowness of the acoustic waveform in the drilling fluid (the mud slowness), DTP represents the compressional slowness of the formation, and BHD represents the borehole diameter. Equation 1 indicates that the dispersion effect is a mathematical function of the shear wave slowness, the mud slowness, the compressional slowness, and the borehole diameter. A parameter describing tool eccentricity may also be included when the tool is eccentric in the borehole.

It can be shown that the dispersion effect is commonly a stronger function of $DT_{mud}$ and BHD and often has comparatively little dependence on DTS or DTP. For instance, for a 7 inch tool centered in an 8.5 inch borehole, the guided wave slowness may be well approximated by an empirical equation of the following form:

$$DTG \approx DTS + \Delta DT_0 + 0.62 \ast (DT_{mud} - 203) \quad \text{Equation 2}$$

where $\Delta DT_0 = 52 \, \mu s/ft$. Those of ordinary skill in the art are readily able to derive other empirical approximations for other tool and borehole geometries.

With continued reference to FIG. 4, one aspect of the present invention is the realization that maximum and minimum slownesses may be estimated by fitting the measured slownesses to a mathematical model of the dependence of acoustic slowness on toolface angle. Coherence processing and/or other processing used to estimate the measured slownesses, and to obtain (or pick) these slownesses is done prior to fitting these slownesses to the mathematical model. Embodiments of the present invention are distinct in this way from conventional techniques used to determine acoustic anisotropy, for example, those that apply an Alford rotation to received acoustic waveforms prior to coherence processing or other processing to determine slowness.

Accordingly, the method 200 further includes fitting the measured slownesses to a mathematical model at 206 to generate a maximum slowness $DT_{max}$ and a minimum slowness $DT_{min}$. FIG. 5 depicts a plot 250 showing a fit 255 of acoustic slowness data versus toolface angle to a mathematical model. The plot 250 shows measurements of acoustic slowness for 35 distinct toolface angles. For an acoustic LWD tool rotating in a borehole at a rate of about one rotation every 500 ms, slowness measurements can be taken about every 1.5 ms to generate 35 data points per rotation. Alternatively, slowness measurements may be grouped together from several tool rotations thereby allowing measurements to be made at a lower frequency. It is to be understood that the rotation rate, the firing interval, and the number of slowness measurements described above are purely exemplary. The invention is in no way limited by these numerical examples.

A mathematical model 255 may be fit to the data by using substantially any suitable fitting routine, for example, including a least squares procedure. Other suitable models may include a periodic function such as a sinusoidal function. The mathematical function may be purely empirical (e.g., as in a least squares procedure) or may be based, for example, on various assumptions about the nature of the formation anisotropy (e.g., leading to the use of a periodic function having a period of 180 degrees).

In an anisotropic formation, the azimuthal dependence of a measured slowness tends to be periodic with a period of 180 degrees. Therefore maximum acoustic slowness values commonly occur at toolface angles 180 degrees apart. These maxima are shown in FIG. 5 at 260A and 260B. Acoustic wave slowness minima typically occur at toolface angles between the maxima (also separated by 180 degrees). These are depicted on FIG. 5 at 270A and 270B. It will be appreciated that the use of a fitting function (as described on FIG. 4 and depicted on FIG. 5) also enables an approximation of the toolface angles at which the maxima and minima are observed.

With still further reference to FIG. 4, method 200 further includes processing 208 the maximum and minimum slownesses to determine an acoustic anisotropy of the formation. In one exemplary embodiment of the invention, the anisotropy $\gamma$ may be expressed mathematically, for example, as follows:

$$\gamma = \frac{DT_{max} - DT_{min}}{(DT_{max} + DT_{min})/2} \quad \text{Equation 3}$$

where $DT_{max}$ and $DT_{min}$ represent the maximum and minimum slownesses (e.g., for the compressional, shear, or guided wave slownesses). In the exemplary embodiment given in Equation 3, the anisotropy is defined as the ratio of the difference between the maximum and minimum slownesses to the average of the maximum and minimum slownesses.

The compressional anisotropy $\gamma_c$ may be determined using maximum and minimum compressional wave slownesses. The shear anisotropy $\gamma_s$ may be determined using either maximum and minimum shear wave slownesses or maximum and minimum guided wave slownesses. Shear and guided wave slownesses may be empirically related, for example, as described above with respect to Equation 2. The shear anisotropy may be obtained from equation 3, for example, as follows:

$$\gamma_s = \frac{DTS_{max} - DTS_{min}}{(DTS_{max} + DTS_{min})/2} \approx \frac{DTG_{max} - DTG_{min}}{(DTG_{max} + DTG_{min})/2} \quad \text{Equation 4}$$

The validity of Equation 4 was tested using numerically simulated waveforms. In the simulation, the true shear anisotropy was 17%. An anisotropy value of 17.2% was obtained using maximum and minimum guided wave slownesses. As such, it will be understood that the shear anisotropy may be advantageously calculated directly from the guided wave slownesses without requiring a dispersion correction. This enables the shear wave anisotropy to be calculated downhole, without the need of further surface processing (e.g., dispersion correction) to complete the calculation of shear wave anisotropy.

Figure 6:
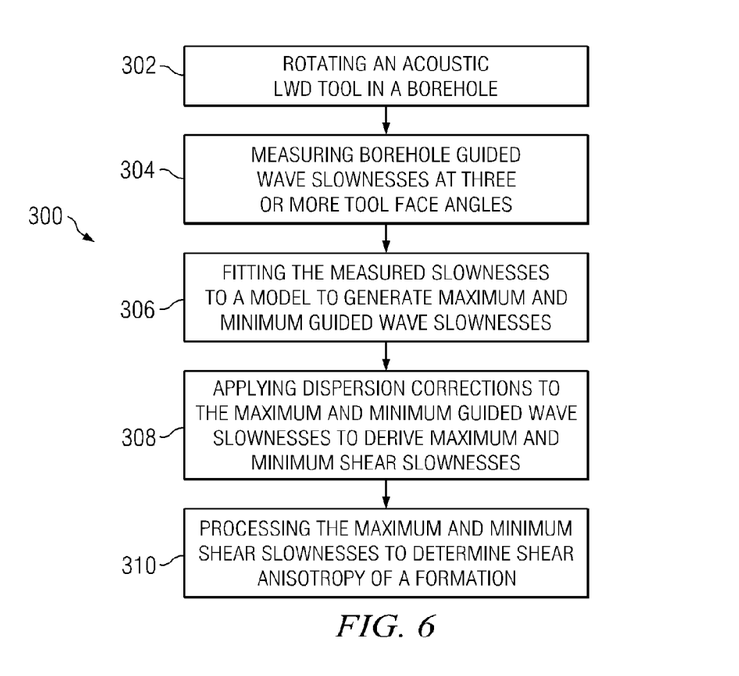
FIG. 6 depicts a flowchart of an alternative method embodiment in accordance with the present invention.

FIG. 6 depicts another method embodiment 300 in accordance with the present invention for determining shear wave anisotropy of a subterranean formation. Method 300 is similar to method 200 (FIG. 4) in that it includes rotating an acoustic LWD tool in a borehole 302. The method further includes measuring guided wave slownesses at three or more toolface angles 304 and fitting the measured guided wave slownesses to a mathematical model at 306 to determine maximum and minimum slowness values. A dispersion correction may be applied at 308 to the maximum and minimum guided wave slowness values to obtain maximum and minimum shear wave slowness values which are in turn processed at 310 to determine the shear anisotropy of the formation.

It will be appreciated that certain of the steps in method 300 are similar to those in method 200 and have therefore been adequately discussed above in connection with FIG. 4. For example, method 300 may make use of similar tool embodiments as described above with respect to FIGS. 2-4. Moreover, the measurement of the guided wave slownesses as a function of toolface angle may also be carried out as described above with respect to method 200. Likewise the guided wave slownesses may be fit to a mathematical model as also described above with respect to method 200.

The application of the dispersion correction to the maximum and minimum guided wave slownesses in 308 to obtain maximum and minimum shear slownesses is preferably applied after the guided wave slownesses have been fit to a mathematical model at 306. In this manner the dispersion correction need only be applied to first and second (maximum and minimum) guided wave slowness values. However, the invention is not limited in this regard. A dispersion correction may be applied to each of the guided wave slowness values (at the three or more toolface angles) to obtain shear wave slowness values. These shear wave slowness values may then be fit with a mathematical model to obtain maximum and minimum shear wave slownesses.

Although not shown in FIG. 2 or FIG. 3, it will be appreciated that acoustic logging whiled drilling tools deployed in accordance with method embodiments of the present include an electronic controller. Such a controller typically includes conventional electrical drive voltage electronics (e.g., a high voltage power supply) for applying waveforms to the at least one transmitter to cause the transmitter to transmit an acoustic waveform. The controller typically also includes receiving electronics, such as a variable gain amplifier for amplifying the relatively weak return signal (as compared to the transmitted signal). That is, the controller is configured to cause the array of acoustic receivers to receive corresponding acoustic waveforms induced in the formation by the transmitted acoustic waveform. The receiving electronics may also include various filters (e.g., pass band filters), rectifiers, multiplexers, and other circuit components for processing the return signal. It will be appreciated that the controller may be disposed in the tool body, or may be located remotely from the tool body (e.g., elsewhere in the drill string). The invention is not limited in this regard.

A suitable controller typically further includes a digital programmable processor such as a microprocessor or a microcontroller and processor-readable or computer-readable programming code embodying logic, including instructions for controlling the function of the tool. Substantially any suitable digital processor (or processors) may be utilized, for example, including an ADSP-2191M microprocessor, available from Analog Devices, Inc.

The controller may be disposed, for example, to execute the method steps described above with respect to FIGS. 4 and 6. For example, the controller may be configured to make acoustic logging while drilling measurements, in which making the measurements includes causing a unipole transmitter to transmit an acoustic waveform at three or more toolface angles while rotating in the borehole, recording the toolface angle when the transmitter is fired, and causing an array of unipole receivers to receive corresponding acoustic waveforms. The controller may be further configured to process received waveforms so as to obtain compressive, shear, and/or guided wave slownesses. The controller may be still further configured to fit the measured slownesses to a mathematical model to generate maximum and minimum slownesses, and to process the maximum and minimum slownesses to determine acoustic anisotropy.

A suitable controller may also optionally include other controllable components, such as sensors, data storage devices, power supplies, timers, and the like. The controller may also be disposed to be in electronic communication with various sensors and/or probes for monitoring physical parameters of the borehole, such as a gamma ray sensor, a depth detection sensor, or an accelerometer, gyro or magnetometer to detect borehole azimuth and inclination as well as the toolface angle of the transmitter and receivers. The controller may also optionally communicate with other instruments in the drill string, such as telemetry systems that communicate with the surface. The controller may further optionally include volatile or non-volatile memory or a data storage device.

Although the present invention and its advantages have been described in detail, it should be understood that various changes, substitutions and alterations can be made herein without departing from the spirit and scope of the invention as defined by the appended claims.

We claim:

1. A method for determining an acoustic anisotropy of a subterranean formation, the method comprising:
  (a) rotating an acoustic logging while drilling tool in a borehole, the tool including at least one acoustic transmitter and a linear array of longitudinally spaced acoustic receivers longitudinally spaced apart from the transmitter;
  (b) measuring an acoustic wave slowness of the formation at three or more toolface angles while rotating the tool in (a);
  (c) fitting the acoustic wave slownesses measured in (b) to a mathematical model to obtain a maximum slowness and a minimum slowness; and
  (d) processing the maximum slowness and the minimum slowness obtained in (c) to determine the acoustic anisotropy of the subterranean formation.

2. The method of claim 1, wherein:
  the at least one acoustic transmitter includes at least one unipole transmitter; and
  the linear array includes a linear array of unipole acoustic receivers.

3. The method of claim 2, wherein the at least one unipole transmitter is a single unipole transmitter, the single unipole transmitter and the array of unipole acoustic receivers being azimuthally spaced by an angle of approximately 180 degrees.

4. The method of claim 2, wherein the at least one transmitter includes first and second unipole transmitters, the first unipole transmitter and the linear array of acoustic receivers being azimuthally aligned and the second unipole transmitter and the linear array of acoustic receivers being azimuthally spaced by an angle of approximately 180 degrees.

5. The method of claim 2, wherein the first unipole transmitter is configured to transmit an acoustic wave having a frequency in the range from about 10 to about 20 kHz and the second unipole transmitter is configured to transmit an acoustic wave having a frequency in the range from about 2 to about 8 kHz.

6. The method of claim 1, wherein (b) comprises measuring acoustic wave slownesses at eight or more toolface angles.

7. The method of claim 1, wherein (b) further comprises measuring a toolface angle corresponding to each of the three or more acoustic wave slowness measurements.

8. The method of claim 1, wherein (b) further comprises:
(i) firing the at least one acoustic transmitter to transmit an acoustic waveform into the formation;
(ii) receiving acoustic waveforms at each of the receivers in the array;
(iii) processing the received waveforms to obtain the acoustic wave slownesses; and
(iv) measuring a toolface at substantially the same time as firing the acoustic transmitter in (i).

9. The method of claim 1, wherein (c) further comprises fitting the acoustic wave slownesses measured in (b) to a periodic mathematical function having a period of 180 degrees.

10. The method of claim 1, wherein (d) further comprises:
(i) processing the maximum slowness and the minimum slowness to obtain a difference between the maximum slowness and the minimum slowness and an average of the maximum slowness and the minimum slowness; and
(ii) dividing the difference between the maximum slowness and the minimum slowness by the average of the maximum slowness and the minimum slowness to obtain the acoustic anisotropy.

11. The method of claim 1, wherein (b) comprises measuring at least one of compressional wave slownesses, shear wave slownesses, and guided wave slownesses.

12. The method of claim 1, wherein:
(b) comprises measuring borehole guided wave slownesses at three or more toolface angles;
(c) comprises fitting guided wave slownesses to a mathematical model to obtain a maximum guided wave slowness and a minimum guided wave slowness; and
(d) comprises processing the maximum guided wave slowness and the minimum guided wave slowness obtained in (c) to determine a shear anisotropy of the subterranean formation.

13. A method for determining shear anisotropy in a subterranean formation, the method comprising:
(a) rotating an acoustic logging while drilling tool in a borehole, the tool including at least one acoustic transmitter and a linear array of longitudinally spaced acoustic receivers longitudinally spaced apart from the transmitter;
(b) measuring guided wave slownesses at three or more toolface angles while rotating the tool in (a);
(c) fitting the guided wave slownesses measured in (b) to a mathematical model to obtain a maximum guided wave slowness and a minimum guided wave slowness;
(d) applying dispersion corrections to the maximum and minimum guided wave slownesses to obtain maximum and minimum shear wave slownesses; and
(e) processing the maximum and minimum shear wave slownesses to determine the shear anisotropy of the subterranean formation.

14. The method of claim 13, wherein the transmitter is a single unipole transmitter, the single unipole transmitter and the array of unipole acoustic receivers being azimuthally spaced by an angle of approximately 180 degrees.

15. The method of claim 13, wherein (b) comprises measuring guided wave slownesses at eight or more toolface angles.

16. The method of claim 13, wherein (b) further comprises measuring a toolface angle corresponding to each of the three or more guided wave slowness measurements.

17. The method of claim 13, wherein (d) further comprises:
(i) processing the maximum shear wave slowness and the minimum shear wave slowness to obtain a difference between the maximum and the minimum shear wave slownesses and an average of the maximum and minimum shear wave slowness; and
(ii) dividing the difference between the maximum and the minimum shear wave slownesses by the average of the maximum and minimum shear wave slownesses to obtain the shear anisotropy.

18. The method of claim 13, wherein:
the logging while drilling tool further comprises a borehole caliper sensor and a mud property sensor configured to measure an acoustic velocity of the drilling fluid and a density of the drilling fluid;
(b) further comprises using the borehole caliper sensor and the mud property sensor to measure a borehole caliper, an acoustic velocity of the drilling fluid, and a density of the drilling fluid; and
(d) further comprises utilizing the borehole caliper, the acoustic velocity of the drilling fluid, and the density of the drilling fluid measured in (b) in the dispersion correction.

19. A method for determining a shear anisotropy of a subterranean formation, the method comprising:
(a) rotating an acoustic logging while drilling tool in a borehole, the tool including at least one unipole acoustic transmitter and a linear array of longitudinally spaced unipole acoustic receivers longitudinally spaced apart from the transmitter;
(b) measuring guided wave slownesses at three or more toolface angles while rotating the tool in (a);
(c) applying dispersion corrections to the guided wave slownesses measured in (b) to obtain corresponding shear slownesses;
(d) fitting the shear slownesses obtain in (c) to a mathematical model to obtain a maximum shear slowness and a minimum shear slowness; and
(e) processing the maximum and the minimum shear slownesses to determine the shear anisotropy of the subterranean formation.

20. The method of claim 19, wherein the transmitter is a single unipole transmitter, the single unipole transmitter and the array of unipole acoustic receivers being azimuthally spaced by an angle of approximately 180 degrees.

* * * * *